Dec. 8, 1959 F. J. MACHOVEC 2,915,853
PORTABLE MOWER CONDITIONING UNIT
Filed Oct. 7, 1957 4 Sheets-Sheet 1

FRED J. MACHOVEC
INVENTOR.

BY
ATTORNEY

FRED J. MACHOVEC
INVENTOR.

BY
ATTORNEY

Dec. 8, 1959        F. J. MACHOVEC        2,915,853
PORTABLE MOWER CONDITIONING UNIT
Filed Oct. 7, 1957        4 Sheets-Sheet 4
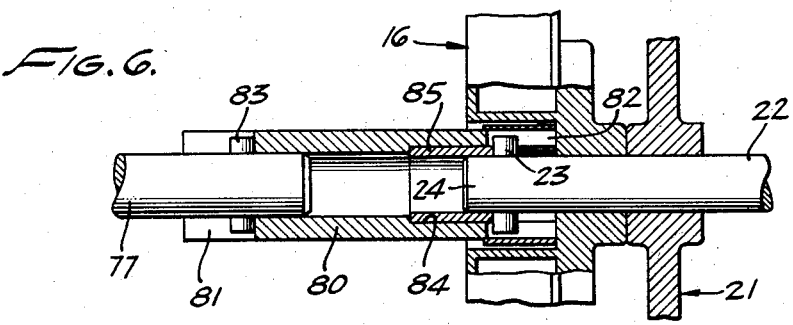
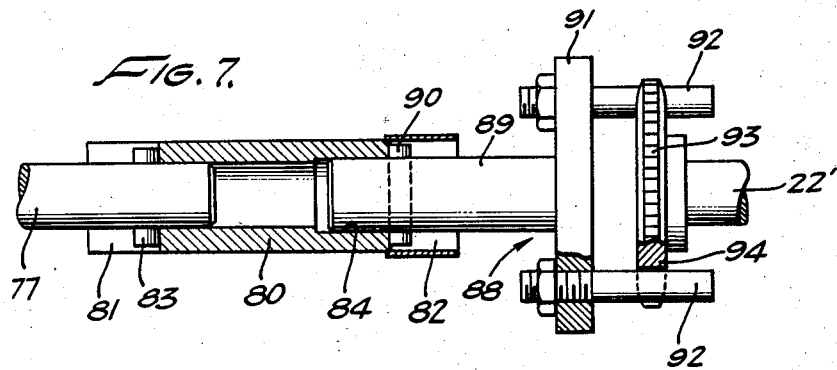
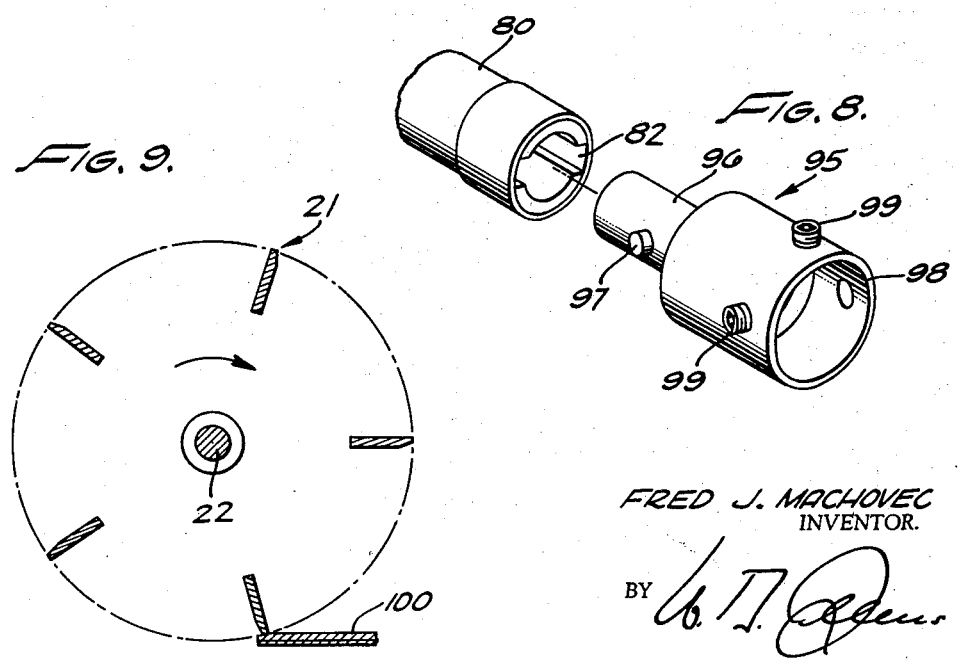
FRED J. MACHOVEC
INVENTOR.
BY
ATTORNEY

United States Patent Office 2,915,853
Patented Dec. 8, 1959

2,915,853

PORTABLE MOWER CONDITIONING UNIT

Fred J. Machovec, Pasadena, Calif.

Application October 7, 1957, Serial No. 688,615

7 Claims. (Cl. 51—26)

This invention relates to portable power units and more particularly to an improved portable power unit designed for use in reconditioning lawn mower reels while in place in the mower and featuring simple adjustments and couplings readily adapting the unit for use with mowers of widely varying sizes, types and designs.

In the reconditioning and lap grinding of lawn mower reels and knife blades it has been common practice for many years to bring the mowers to a central shop having specialized equipment by which the reels can be reground and reconditioned after disassembly from the mower. This practice is time-consuming, laborious and prohibitively expensive. In consequence, mowers in need of simple reconditioning have been retained in service until the time and expense of a complete general overhaul could be justified. Certain proposals have been made for the use of a portable reconditioning unit which could be used in the field to grind or otherwise recondition the reel while assembled to the mower.

Some attempts have also been made to rotate the reel as lapping compound is applied to its edges, use being made of the bed plate or cutting knife in lap-finishing the reel. This latter technique has the advantage of refinishing the reel simultaneously wtih the knife plate. A further and important advantage resides in the fact that it is unnecessary to remove either the bed plate or the reel thereby effecting a great saving in time and labor. However, proposed designs having the foregoing objectives in mind have been far from satisfactory because of numerous shortcomings including the complexity of the portable unit, the lack of the desired flexibility of components to accommodate different mower designs and the lack of satisfactory means for coupling the power unit to the reel.

These and other shortcomings of prior designs are completely obviated in the present unit featuring great flexibility, simplicity of design, ruggedness, and a set of quickly detachable coupling adapters by which the power unit may be coupled to all known drives for mower reels. Included with the unit are adjustable pedestals by which the mower may be supported with its wheels off the ground in position for the coupling of the power unit to the outboard end of the mower reel, there being a single manually-adjustable means on the power unit for adjusting the power drive to lie opposite the end of the mower reel. A set of simple coupling adapters enable the user to couple the power unit to the reel regardless of the type of drive connection carried by reel.

The power unit per se features a driving motor having a combined speed reduction device and power output supported by a pivoting rigid arm journaled on the motor drive shaft. The speed reduction device includes series connected flexible belts provided with simple, easily adjusted means for varying belt tension. Owing to the mode of supporting the speed reduction means from the motor drive shaft, tensioning of the belts imposes no load on the motor bearing with the result that inexpensive, conventionally available motors may be used in long service without need for replacing the bearings or installing special heavy duty bearings.

Accordingly, it is a primary object of the present invention to provide an improved, completely self-contained portable mower reconditioning unit adapted for use in reconditioning mowers in the shop or in the field irrespective of their type or size.

Another object of the invention is the provision of a simple, compact, lightweight power unit having an output drive shaft provided with coupling means adapted for telescopic coupling to the exposed outboard end of a mower reel while in its normal operating position in a lawn mower.

Another objection of the invention is the provision of a portable mower conditioning unit having a drive motor provided with speed reduction means supported on an arm having one end journaled about the motor drive shaft and the other end adapted to be adjustably supported at different heights above the ground.

Another object of the invention is the provision of a lawn mower conditioning unit adapted for use in the field and featuring a portable power unit adapted to rest on the ground opposite one end of a mower with its wheels supported out of contact with the ground and with the outboard end of the mower reel aligned with the power outlet connection of the power unit.

These and other more specific objects will appear upon reading the following specification and claims and upon considering in connection therewith the attached drawings to which they relate.

Referring now to the drawings in which a preferred embodiment of the invention is illustrated:

Figure 6 is a fragmentary sectional view of one of the drive connections between the power unit and the mower reel;

Figure 7 is a similar view of a modified coupling adapter assembled to the outboard end of a mower reel employing a pinion gear;

Figure 8 is an isometric view of another type of reel coupling; and

Figure 9 is a transverse sectional view through a typical mower reel and its bed plate.

Figure 1:
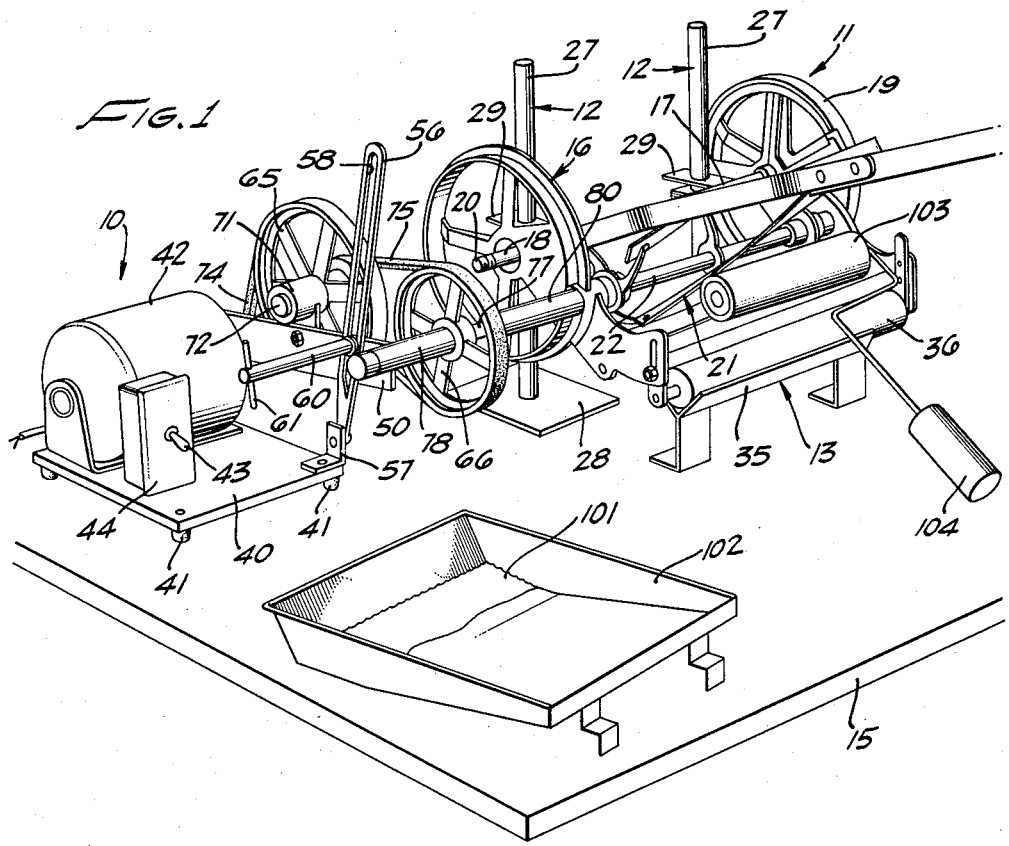
Figure 1 is a general perspective view of the apparatus of the present invention coupled to a typical lawn mower in readiness to recondition the reel and knife blade thereof.
Figure 2:
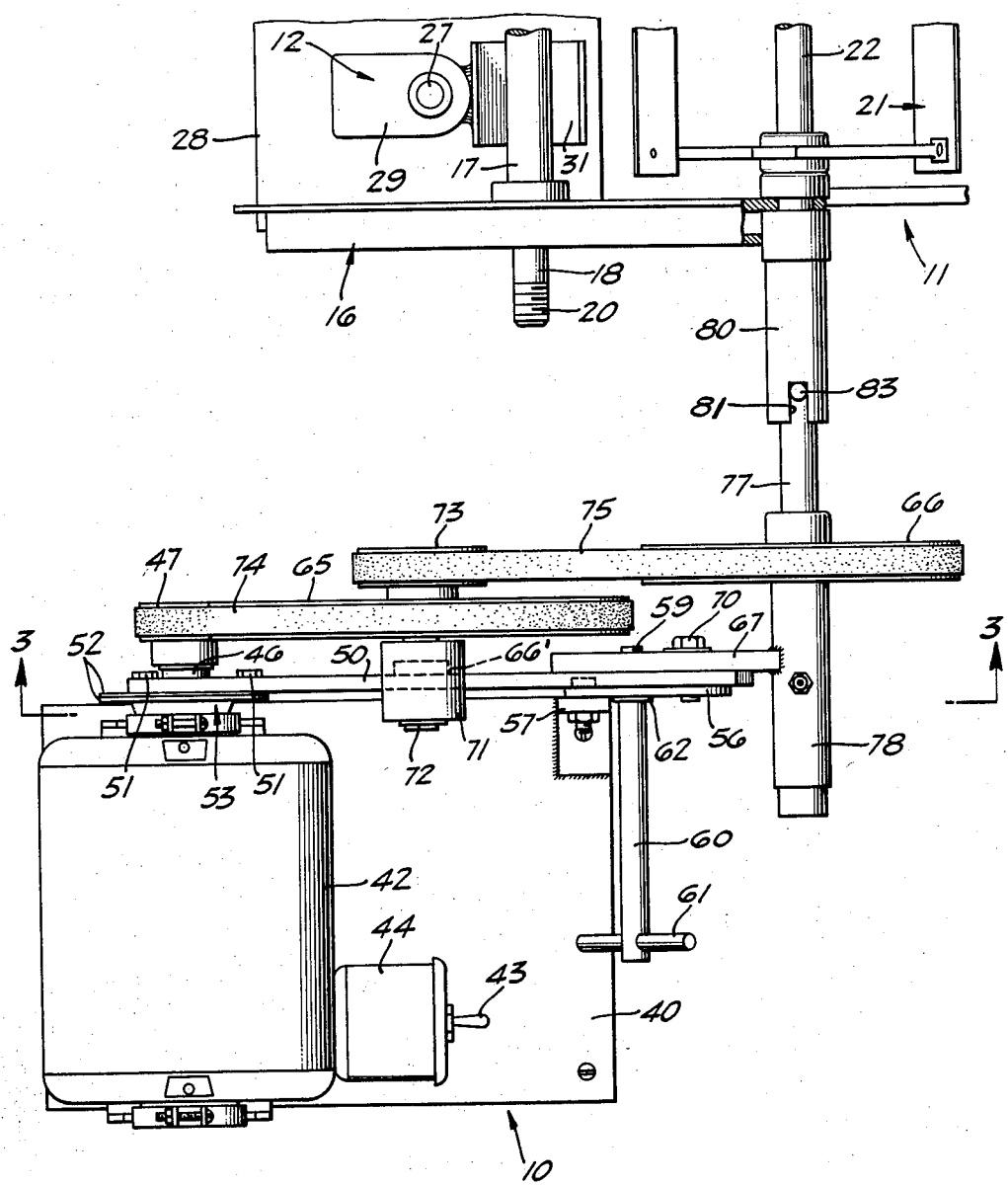
Figure 2 is a top plan view on an enlarged scale of the power unit and showing a portion of the lawn mower being reconditioned thereby.

Referring more particularly to Figures 1 and 2, there is shown a portable mower conditioning unit according to the present invention designated generally 10 operatively connected to a typical lawn mower designated generally 11, the latter being temporarily supported on a couple of identical adjustable supports 12, 12 and a non-adjustable rear support 13. As shown in Figure 1, the entire assembly is supported on a shelf or work bench 15 but it will be understood that in normal usage, the reconditioning is performed in the field with all components including the portable power unit supported from the ground. It will be further understood that mowers of widely varying types, weights and sizes are adapted to be reconditioned by the present equipment, the only essential preliminary requirement being the elevation of the supporting wheels out of contact with the ground and the removal of one supporting wheel if necessary to provide driving access to its reel.

The conventional mower shown in Figures 1 and 2 includes a main frame 16 having a crossbar 17 provided with trunnions 18 at its outer ends to which the supporting drive wheels 19 are rotatably secured in any suitable manner, as by threads 20 for a nut not shown. The usual reel 21 is supported at the rear margin of frame 16 on shaft 22 here shown as having a fixed radial pin 23 projecting from its outboard end 24 and drivingly seating a conventional drive pinion meshing with internal teeth on the inner rim of supporting wheel 19 (Figure 1). This pinion is not shown but will be understood as being of the usual type found on all inexpensive type lawn mowers.

Figure 5:
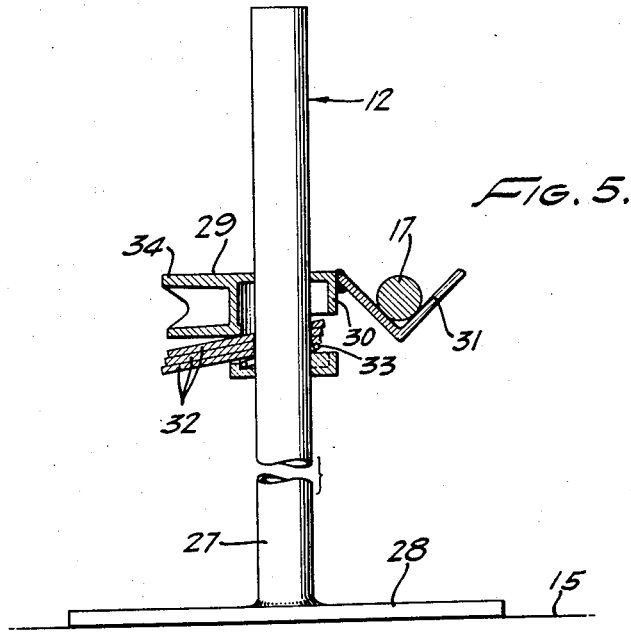
Figure 5 is an elevational view of one of the mower supporting pedestals with certain parts being shown in section.

To provide for the rigid support of the lawn mower with its driving wheels off the ground so that reel 21 may be freely rotated, there is provided a pair of pedestals designated generally 12 and shown in detail in Figure 5. These include a tubular upright member 27 rigidly fixed to a supporting base 28 as by welding and adjustably supporting a clamp 29. Clamp 29 includes a sleeve 30 freely slidable along tube 27 and having a notched jaw 31 projecting from one edge and adapted to seat some part of the mower frame such as cross bar 17. A clutch adjustably supporting sleeve 30 in a desired position along tube 27 is here shown as comprising a series of washer plates 32 having sharp-edged openings freely slidable along tube 27 when held normal to the tube but biased by a spring 33 into an inclined position in which their sharp edges dig into and interlock with tube 27. Release of the locking washers is effected by lifting upwardly on the outer ends of plates 32 making use of the overlying fingerpiece 34. The rear end of the mower may be supported off the ground by nonadjustable support 13 having a trough-shaped channel 35 along its top side shaped to underlie the usual roller 36.

Portable power unit 10 includes a base plate 40 having resilient feet 41 at its corners and a suitable driving motor 42 secured thereto. Motor 42 may comprise a gasoline motor but preferably a reversible electric motor such as that shown at 42 in Figures 1 and 2, the direction of operation of this motor being controlled in any suitable manner as by the direction in which the pivoting control handle 43 of switch mechanism 44 is moved from its neutral or off position. Motor 42 has the usual drive shaft 46 projecting from one end and rigidly supporting a small diameter belt pulley 47 of suitable speed reduction means such as the series-connected belt speed reducer shown in the drawings.

Figure 3:
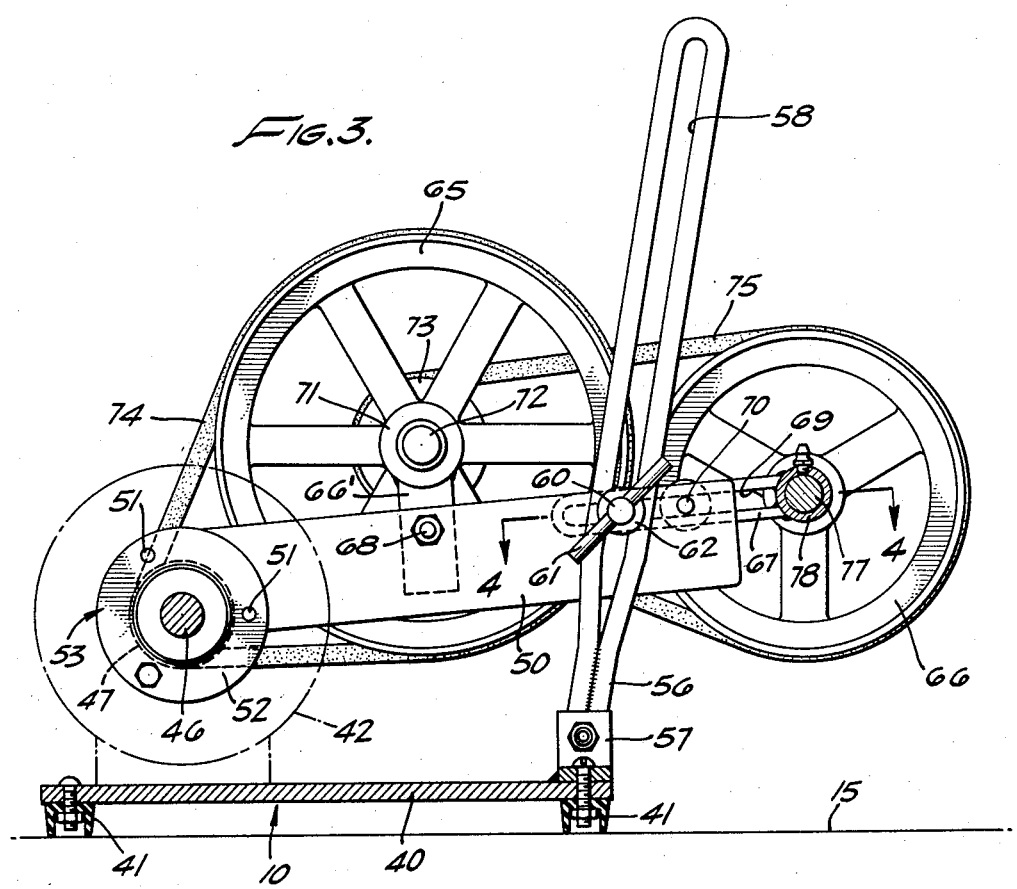
Figure 3 is a transverse sectional view taken on line 3—3 on Figure 2.

The speed reducer is best shown in Figures 2 and 3 as comprising a long rigid arm 50 having one end rigidly secured by cap screws 51 to the radial flanges 52 of a spherical ball-bearing journal assembly 53 the inner raceway of which is fixed to motor drive shaft 46. Cap screws 51 are here shown as holding the oppositely cupped halves of the outer bearing raceways together and secured to rigid arm 50. Manually adjustable means for holding arm 50 rigidly in a desired angular position relative to the ground is shown in Figures 1 and 3 as comprising a rigid link 56 with its lower end pivotally connected to base 40 through a bracket 57. Slot 58 of the link seats the threaded shank 59 of a clamping screw 60 having a handle 61 at its outer end by which it may be rotated. The flanged shoulder 62 of handle 60 is adapted to bear against one face of link 56 and to be clamped thereagainst as the threaded shank 59 of the handle is screwed into a threaded opening of arm 50. The strong frictional clamp thereby provided between link 56 and arm 50 is found to be highly effective in rigidly supporting arm 50 in any adjusted position, it being understood that this arm is free to swing through a wide arc about the motor shaft as required to properly position the output end of the speed reduction assembly relative to the end of the mower reel.

Figure 4:
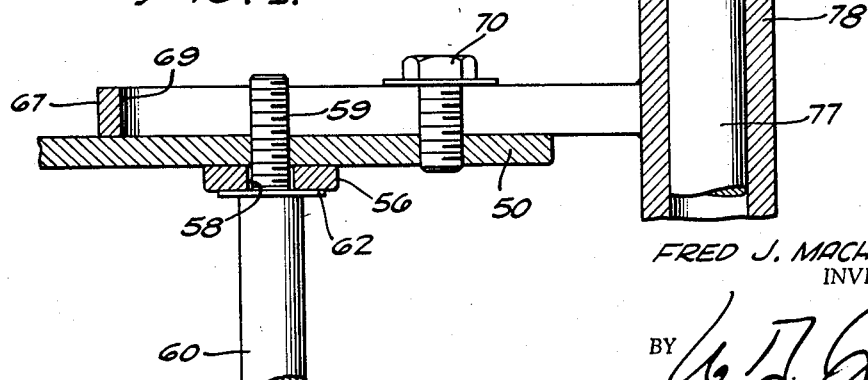
Figure 4 is a fragmentary sectional view taken along line 4—4 of Figure 3.

The illustrated speed reduction assembly comprises two large diameter pulleys 65 and 66 individually adjustably supported along arms 50 by means of brackets 66' and 67. Bracket 66' is pivotally connected to the midportion of arm 50 by clamping bolt 68 whereas bracket 67 is slotted at 69 so that it may be moved lengthwise about a clamping bolt and washer assembly 70. Rotation of bracket 67 is prevented by bolt assembly 70 in cooperation with shank 59 of clamping screw 60 (Figure 4). Fixed to the upper end of bracket 66' is a sleeve 71 in which is journaled a shaft 72 having fixed thereto pulley 65 and small pulley 73. Output shaft 77 of the speed reducer is journaled in along sleeve 78 rigidly secured to the outer end of the adjustable supporting bracket 67 in the manner made clear by Figure 2. Output pulley 66 is rigidly fixed to shaft 77 in alignment with small pulley 73 and cooperates in supporting usual flexible drive belt 75. A second flexible drive belt 74 is supported about pulleys 47 and 65. The adjustment of one of the pulley supporting brackets 66' and 67 usually will require a compensating adjustment of the other bracket inasmuch as the adjustment of the tension of one belt affects to some degree the tensioning of the other; however, since there are only two adjustments involved in the tensioning of the belts, it is a relatively simple matter to obtain the desired tension in each belt.

One of the coupling adapters by which the power unit may be connected to rotate reel 21 is best shown in Figures 2 and 6 as comprising a tubular sleeve 80 radially slotted at 82 and 81 to respectively seat over radial pin 23 in reel shaft 22 and over radial pin 83 extending diametrically of and secured within a bore of outward shaft 77. As is best shown in Figure 6, the outer end of sleeve 80 is provided with a bore 84 adapted to telescope over and fit slightly smaller outboard ends of mower reel 24. In the case of mower reels having a smaller size shaft 24, an adapter sleeve 85 is seated in bore 84 with its outer end terminating generally opposite the inner end of notches 82. Still smaller reel shafts may be driven by the same coupling sleeve 80 but having a bushing sleeve similar to sleeve 85 but provided with a suitable smaller internal diameter.

Referring to Figure 7 there is shown a different coupling adapter using the same sleeve 80 as described in connection with Figure 6 but having telescoped within its bore 84 a simple metal adapter designated generally 88 provided with a shank 89 and a radial pin 90. Shank 89 fits within bore 84 while pin 90 is adapted to seat in notches 82, the shank being provided on its outer end with a radial flange 91 in which are mounted a pair of pins 92 projecting axially therefrom and adapted to seat between the teeth 93 of a chain-driven sprocket 94 fixed to reel shaft 22'. This adapter assembly is designed for use with large lawn mowers wherein the reel is driven through a roller chain meshing with a sprocket fixed to the outboard end of the reel. In this case it is merely necessary to remove the roller chain and to seat adapter pins 92 between teeth located on opposed sides of the sprocket.

Referring to Figure 8, there is shown another form of adapter coupling designed for use with reels fitted with pinions on the outboard end. The outer end of couling sleeve 80 is adapted to be coupled to a cup-shaped adapter designated generally 95 having a shank 96 formed to seat in the end of sleeve 80 and to be coupled thereto through a radial pin 97 seating in slot 82. The thin-walled cupped end 98 of adapter 95 is provided with one or more set screws 99 which may be screwed inwardly between the teeth of the pinion.

The operation of the described portable unit to recondition the reel and knife blade of the mower will be readily understood from the foregoing detailed description of its components. The first step in coupling the power unit to the mower is to support the mower on the pedestals 12 and 13 in the manner described and illustrated in Figure 1. Thereafter one of the driving wheels 19 is removed as is the drive pinion from the outboard end 24 of reel 21. The portable power unit 10 is then positioned opposite the end of the mower from which the wheel has been removed with the output shaft 77 of the power unit generally opposite the exposed end of the reel. Shaft 77 of the power unit is brought into alignment with the reel while clamping screw 69 of the adjusting link 56 is loosened. Once shaft 77 has been brought into alignment with the reel, clamping screw 69 is firmly tightened. Thereafter coupling sleeve 80 is connected between the end of shaft 77 and the end of the reel shaft and the power unit is shifted toward the mower as necessary to telescope the coupling adapter to the reel. Motor control switch 43 is closed to drive the motor in a direction to rotate the reel clockwise as viewed in Figure 9 with the reel blades rotating downwardly and outwardly over the cutting edge of knife bar 100. Lapping compound 101 contained in a shallow trough 102 is applied to an absorbent roller-type applicator 103 supported from a handle 104. After the roller has been coated lightly with compound, the roller is held in the manner generally indicated in Figure 1 so that the outer edges of the reel blades pass over the roller and become coated with lapping compound. This compound is carried downwardly against the edge of knife blade 100 where it acts to lap the edges of the reel blades as well as the upper forward surface of knife blade 100. The operator continues to apply lapping compound from time to time as necessary and cutting blade 100 is adjusted to maintain it in light contact with the edge of the reel blade.

Once the reel and the cutting blade have been properly lapped and reconditioned, the power unit is deenergized and removed. Before this is accomplished it may be desirable to operate the reel in reverse direction, an operation which is accomplished by reversing the position of the motor control switch 43. After the mower has been lapped in the manner described, the power unit is removed and the disconnected drive wheel 19 and reel pinion are restored to their normal operating positions.

Mowers having reels driven by roller chains and sprocket wheels are reconditioned in the same manner described above except that the coupling adapter 88 shown in Figure 7 is coupled in series with sleeve 80 after the roller chain is removed from sprocket 93. Coupling adapter 95 shown in Figure 8 may be also used with sprocket wheels as well as with pinion gears fixed to the reel shafts.

If it should become necessary to adjust the tension on the drive belt of the speed reduction assembly or to replace these belts, this is easily accomplished by loosening the lock bolts 68, 70 connecting the brackets for the larger diameter wheels 65 and 66 to rigid arm 50. After the supporting brackets have been adjusted as necessary to slacken or tighten the belts the lock bolts are tightened to maintain the desired tension.

While the particular portable self-contained assembly for reconditioning lawn motors herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A lawnmower lapping device comprising a power-driven unit adapted to be readily carried in one hand to the site of a lawnmower having a reel and a knife bar and there connected to the drive of a mower reel while lap-grinding the reel against the mower's own knife bar, said unit comprising a base, a motor secured directly to said base and having an output shaft, a bracket having one end journaled directly on and supported solely by said motor shaft, a pulley secured to said motor shaft, a plurality of speed reducing pulleys journaled to said bracket and interconnected to one another and to said motor pulley by a plurality of belts, separate means for adjusting the tension on each belt, means for coupling the slowest of said pulleys to the mower reel to drive the same, and means to adjust said bracket about the axis of said motor shaft in a plane normal thereto to bring the axis of said slowest pulley into axial alignment with the drive for the mower reel to be lapped and including means for clamping said bracket rigidly in a desired adjusted position.

2. A lawn mower lapping device as defined in claim 1 characterized in that said bracket adjusting and clamping means includes a strut having one end pivotally connected to said motor supporting base, said strut having its opposite end located beside said bracket in an area remote from said motor shaft, and said adjustable clamping means including a long slot in said strut and clamping means extending therethrough and operable when tightened to lock said strut and bracket against relative movement with said bracket supported in a predetermined fixed position relative to said motor supporting base.

3. A lawnmower lapping device as defined in claim 1 characterized in that said coupling means is readily separable from said slow pulley and including means at the opposite ends of said coupling means engageable with means on said mower and other means fixed to said slow pulley and cooperable therewith to rotate the mower reel when said motor is energized.

4. A lawn mower lapping device as defined in claim 1 characterized in the provision of a plurality of separate and unconnected low-height supports adapted to underlie spaced-apart portions of a mower and cooperable with the latter to support the mower knife bar and reel clear of the ground and with the reel drive aligned with the axis of said slow speed pulley.

5. A lawn mower lapping device as defined in claim 1 characterized in the provision of axially wide antifriction bearing means mounted about said motor shaft and rigidly secured at its rim to said pulley supporting bracket.

6. A lawn mower lapping device as defined in claim 1 characterized in that said coupling means includes a pair of pins spaced to either side of the axis of said slow pulley and parallel to the axis thereof, said pins being adapted for insertion between the teeth of a sprocket wheel drive for said mower reel and cooperable therewith to drive the reel during the lap-grinding thereof.

7. A lawn mower lapping device as defined in claim 1 characterized in the provision of a set of different couplings selectively couplable to said slow pulley and to mowers having different driving connections for the mower reel, the coupling selected for a given mower being adapted to form a positive interfitting driving connection between said power-driven unit and a particular type of mower reel drive connection whereby the same power-driven unit may be used to lap a wide range of mower constructions.

References Cited in the file of this patent

UNITED STATES PATENTS

| | | |
|---|---|---|
| 1,287,073 | Mitchell | Dec. 10, 1918 |
| 1,866,794 | Bierman | July 12, 1932 |
| 2,343,072 | Miller | Feb. 29, 1944 |
| 2,522,960 | Price | Sept. 19, 1950 |
| 2,722,780 | Smith | Nov. 8, 1955 |